United States Patent
Okada et al.

(10) Patent No.: US 8,244,055 B2
(45) Date of Patent: Aug. 14, 2012

(54) IMAGE PROCESSING APPARATUS AND METHOD, AND PROGRAM

(75) Inventors: Shintaro Okada, Tokyo (JP); Kazuhiko Nishibori, Kanagawa (JP); Tomohiro Nishi, Tokyo (JP); Toshinori Ihara, Tokyo (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 12/489,766

(22) Filed: Jun. 23, 2009

(65) Prior Publication Data

US 2009/0324125 A1    Dec. 31, 2009

(30) Foreign Application Priority Data

Jun. 25, 2008  (JP) ................. P2008-166062

(51) Int. Cl.
*G06K 9/40* (2006.01)
(52) U.S. Cl. .................... 382/274; 382/254
(58) Field of Classification Search .......... 382/100, 382/254, 274
See application file for complete search history.

(56) References Cited

U.S. PATENT DOCUMENTS

| | | | |
|---|---|---|---|
| 5,920,360 A * | 7/1999 | Coleman, Jr. ............. | 348/700 |
| 6,084,641 A * | 7/2000 | Wu ............................ | 348/722 |
| 7,599,437 B2 * | 10/2009 | Chujoh et al. ........... | 375/240.16 |
| 8,090,029 B2 * | 1/2012 | Date et al. ............... | 375/240.26 |
| 2003/0206593 A1 * | 11/2003 | Srinivasan et al. ....... | 375/240.16 |

FOREIGN PATENT DOCUMENTS

| | | |
|---|---|---|
| JP | 06-339124 | 12/1994 |
| JP | 08-046925 | 2/1996 |
| JP | 2000-333134 | 11/2000 |
| JP | 2007-243627 | 9/2007 |
| JP | 2008-097474 | 4/2008 |

\* cited by examiner

*Primary Examiner* — Stephen R Koziol
(74) *Attorney, Agent, or Firm* — Finnegan, Henderson, Farabow, Garrett & Dunner LLP

(57) ABSTRACT

An image processing apparatus includes: a difference-value calculation mechanism calculating a difference value between the first accumulated value produced by accumulating luminance values of a plurality of pixels in a first image and the second accumulated value produced by accumulating luminance values of a plurality of pixels in a second image having a difference in time with the first image; a threshold-value creation mechanism for creating a plurality of threshold values on the difference value in accordance with the first accumulated value, corresponding to the luminance change levels in order to grade a luminance change between the first image and the second image by a luminance change level indicating a degree of the luminance change; and a luminance-change-level determination mechanism for determining the luminance change level corresponding to the difference value on the basis of the plurality of threshold values.

8 Claims, 11 Drawing Sheets

IMAGE PROCESSING APPARATUS AND METHOD, AND PROGRAM

BACKGROUND OF THE INVENTION

1. Field of the Invention

The present invention relates to an image processing apparatus and method, and a program. More particularly, the present invention relates to an image processing apparatus, method, and a program that enables the detection of fade-in and fade-out more easily.

2. Description of the Related Art

In general, frame-rate conversion processing is provided in order to produce interpolated images. In the frame-rate conversion processing, motion vectors are first detected by a block matching method, motion compensation processing then is performed using the motion vectors, and thereby new interpolated images (interpolated frames) are created from before and after images (frames) in time.

FIG. 1 is a diagram illustrating a concept of frame-rate conversion processing.

In FIG. 1, the horizontal axis represents time (unit is second), and the vertical axis represents a position when movement of an image is expressed in one dimension. The horizontal axis has marks for every 1/120 second. Also, in FIG. 1, a large outlined circle shows an input image signal, and a small solid-black circle shows an output image signal. That is to say, FIG. 1 shows a state in which an input image whose film mode is video of 60 Hz is subjected to frame-rate conversion into an output image of 120 Hz.

In the frame-rate conversion processing, as shown in FIG. 1, the output image is generated so as to interpolate positions (movements) of the input image.

In such motion vector detection by a block matching method, when an image fades in or fades out, motion vectors are sometimes mistakenly detected as images having movements in spite of the fact that the image is actually a still image. In this case, a distorted interpolated image is output by the motion compensation processing using the motion vectors detected mistakenly.

Accordingly, proposals have been made to detect a still image portion that has faded in or faded out, and motion vectors in the still image portion are determined to be 0 (for example, refer to Japanese Unexamined Patent Application Publication No. 2007-243627).

SUMMARY OF THE INVENTION

In a method described in Japanese Unexamined Patent Application Publication No. 2007-243627, a determination of whether a fade-in or a fade-out has occurred is made by threshold value processing on luminance values (comparison between a luminance value and a predetermined threshold value).

However, the threshold value used in the above-described threshold value processing is a fixed value, and thus it is necessary for the threshold value to be set by a user's operation.

The present invention has been made in view of such circumstances. It is desirable to enable detection of fade-in and fade-out more easily without setting a threshold value by a user's operation.

According to an embodiment of the present invention, there is provided an image processing apparatus including: a difference-value calculation means for calculating a difference value between the first accumulated value produced by accumulating luminance values of a plurality of pixels in a first image and the second accumulated value produced by accumulating luminance values of a plurality of pixels in a second image, having a difference in time with the first image; a threshold-value creation means for creating a plurality of threshold values on the difference value, in accordance with the first accumulated value, corresponding to the luminance change levels in order to grade a luminance change between the first image and the second image by a luminance change level, indicating a degree of the luminance change; and luminance-change-level determination means for determining the luminance change level corresponding to the difference value on the basis of the plurality of threshold values.

An image processing apparatus according to the embodiment may further include: motion-vector detection means for detecting a motion vector by block matching the first image and the second image; motion-compensation image generation means for generating a motion compensation image by compensating motion on the first image by the motion vector; and interpolated-image output means for combining each pixel in the first image and a corresponding pixel in the motion compensation image in a ratio in accordance with the luminance change level determined by the luminance-change-level determination means.

In an image processing apparatus according to the embodiment, the higher the luminance change level determined by the luminance-change-level determination means is, the higher ratio of the first image in the interpolated image may be output by the interpolated-image output means, and the lower the luminance change level is, the higher ratio of the motion compensation image in the interpolated image may be output by the interpolated-image output means.

An image processing apparatus according to the embodiment may further include contracted-image generation means for generating a first contracted image produced by contracting the first image, wherein the difference-value calculation means may calculate a difference value between the first luminance value, produced by accumulating luminance values of a plurality of pixels in the first contracted image, and the second luminance value, produced by accumulating luminance values of a plurality of pixels in the second contracted image.

In an image processing apparatus according to the embodiment, the motion-vector detection means may detect the motion vector from the first contracted image and the second contracted image.

According to another embodiment of the present invention, there is provided a method of processing an image, including the steps of: calculating a difference value between the first accumulated value produced by accumulating luminance values of a plurality of pixels in a first image and the second accumulated value produced by accumulating luminance values of a plurality of pixels in a second image having a difference in time with the first image; creating a plurality of threshold values on the difference value, in accordance with the first accumulated value, corresponding to the luminance change levels in order to grade a luminance change between the first image and the second image by a luminance change level indicating a degree of the luminance change; and determining the luminance-change-level corresponding to the difference value on the basis of the plurality of threshold values.

According to another embodiment of the present invention, there is provided a program for causing a computer to perform processing including the steps of: calculating a difference value between the first accumulated value produced by accumulating luminance values of a plurality of pixels in a first image and the second accumulated value produced by accumulating luminance values of a plurality of pixels in a second image having a difference in time with the first image; creating a plurality of threshold values on the difference value, in accordance with the first accumulated value, corresponding to the luminance change levels in order to grade a luminance change between the first image and the second image by a luminance change level, indicating a degree of the luminance change; and determining the luminance-change-level corresponding to the difference value on the basis of the plurality of threshold values.

In an embodiment of the present invention, a difference value is calculated between the first accumulated value produced by accumulating luminance values of a plurality of pixels in a first image and the second accumulated value produced by accumulating luminance values of a plurality of pixels in a second image having a difference in time with the first image. In order to grade a luminance change between the first image and the second image by a luminance change level indicating a degree of the luminance change, a plurality of threshold values on the difference value are created corresponding to the luminance change levels in accordance with the first accumulated value. A determination is made on the luminance-change level corresponding to the difference value on the basis of the plurality of threshold values.

By an embodiment of the present invention, it becomes possible to detect a fade-in and a fade-out more easily.

DESCRIPTION OF THE PREFERRED EMBODIMENTS

In the following, a description will be given of an embodiment of the present invention with reference to the drawings.

Figure 1:
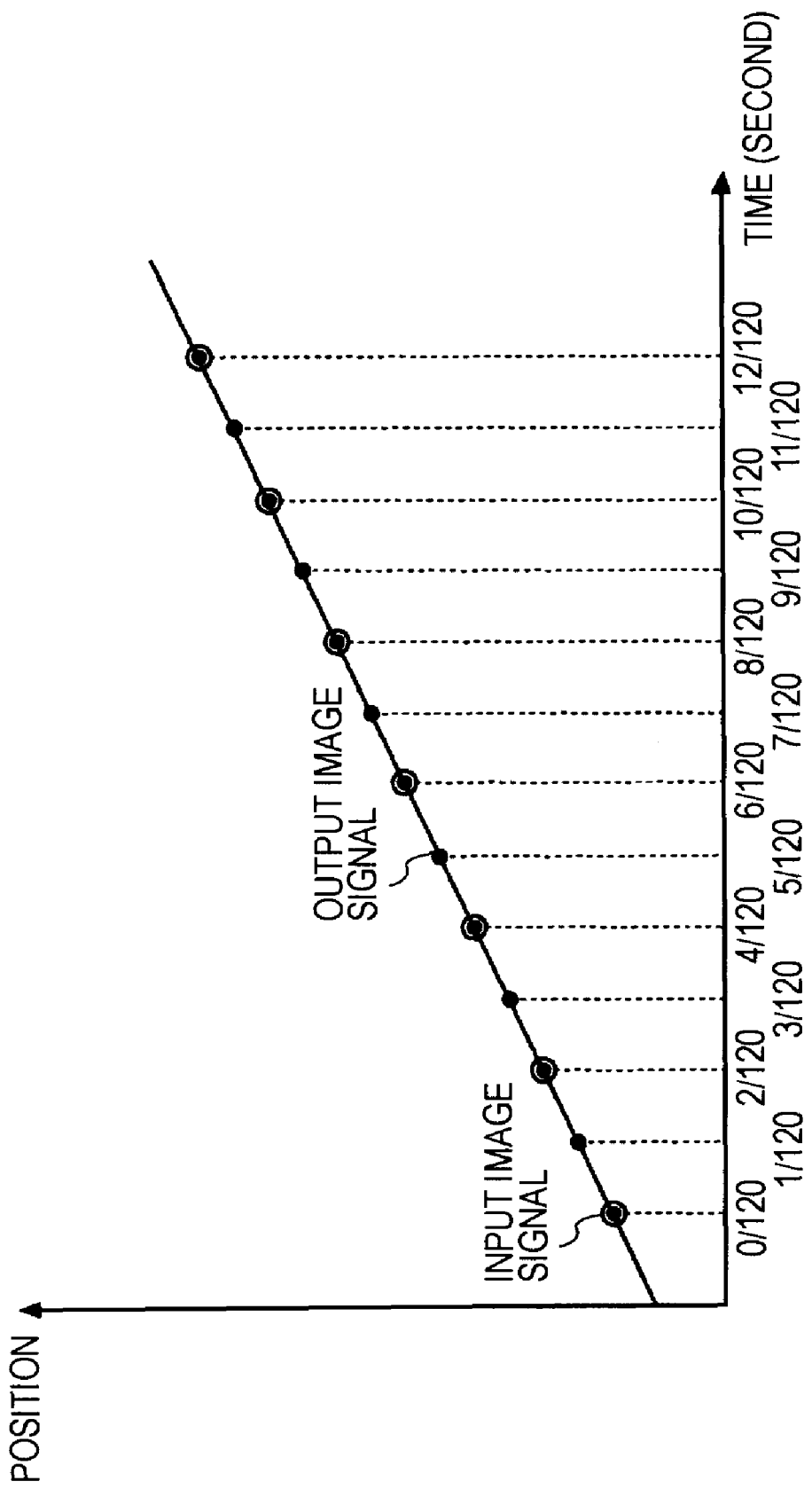
FIG. 1 is a conceptual diagram of frame rate conversion.
Figure 2:
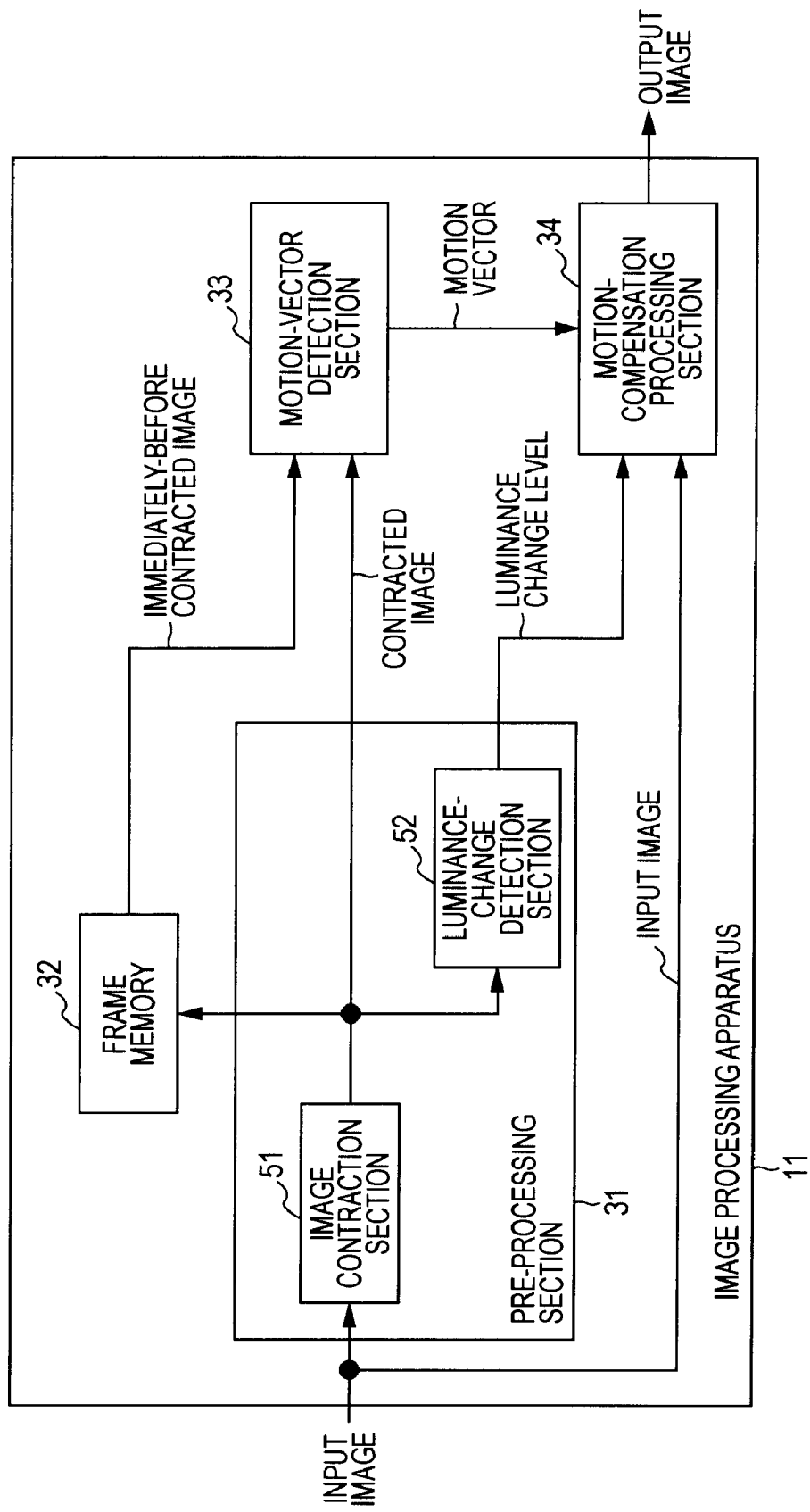
FIG. 2 is a block diagram illustrating an example of a configuration of an image processing apparatus according to an embodiment of the present invention.

FIG. 2 illustrates an example of a configuration of an image processing apparatus according to an embodiment of the present invention.

An image processing apparatus 11 in FIG. 2 detects a fade-in and a fade-out in an input image, creates interpolated images (interpolated frames) in accordance with the detection result, and outputs an output image that has been subjected to frame rate conversion. In this regard, the detection of a fade-in or a fade-out is also suitably called fade detection in the following.

The image processing apparatus 11 in FIG. 2 includes a pre-processing section 31, a frame memory 32, a motion-vector detection section 33, and a motion-compensation processing section 34.

The pre-processing section 31, includes an image contraction section 51 and a luminance-change detection section 52, generates a contracted image of an input image, and detects a change in the luminance of the contracted image. More specifically, the image contraction section 51 generates, for example, a contracted image ¼ times the input image by thinning the input image, and supplies the contracted image to the frame memory 32, the motion-vector detection section 33, and the luminance-change detection section 52. The luminance-change detection section 52 performs fade detection by detecting a luminance change between the contracted image supplied from the image contraction section 51 and the contracted image produced by delaying the contracted image by one frame (between different frames in time). The luminance-change detection section 52 supplies a luminance change level indicating a degree of the detected luminance change to the motion-compensation processing section 34. In this regard, details of the luminance-change detection section 52 will be described later with reference to FIG. 3.

The frame memory 32 temporarily stores the contracted image supplied from the image contraction section 51, and supplies an image one frame immediately before (in the following, called an immediately-before contracted image) with respect to the contracted image from the image contraction section 51 to the motion-vector detection section 33.

The motion-vector detection section 33 performs block matching on the basis of the contracted image from the image contraction section 51 and the immediately-before contracted image from the frame memory 32, and obtains a motion vector for each pixel of the contracted image. More specifically, the motion-vector detection section 33 reads out pixels in a block of interest corresponding to the pixels of interest (pixels to be processed) of the contracted image and pixels of reference blocks corresponding to individual pixels (reference pixels) of the immediately before contracted image, and obtains the sum of absolute differences of the pixel values (for example, luminance values) of the individual corresponding pixel positions. Also, the motion-vector detection section 33 compares the sum of absolute differences obtained for individual reference pixels, and obtains a reference pixel having a minimum sum of absolute differences. Then, the motion-vector detection section 33 calculates a motion vector from the pixel of interest in the contracted image and the reference pixel having a minimum sum of absolute differences, and supplies the motion vector to the motion-compensation processing section 34.

The motion-compensation processing section 34 generates an MC (Motion Compensation) image (motion-compensated image) by performing motion compensation on the basis of the input image and the motion vector. Also, the motion-compensation processing section 34 combines the MC image and the input image on the basis of the luminance change level from the luminance-change detection section 52, and outputs the image as an output image. A detailed description will be given of the motion-compensation processing section 34 later with reference to FIG. 6.

Next, a description will be given of an example of a functional configuration of the luminance-change detection section 52 with reference to a block diagram of FIG. 3.

The luminance-change detection section 52 includes a luminance accumulation section 71, a delay section 72, a difference calculation section 73, a coring section 74, a threshold-value processing section 75, and a threshold-value creation section 76.

The luminance accumulation section 71 accumulates the luminance values of the individual pixels for one frame of the contracted image from the image contraction section 51, and supplies the accumulation result (in the following, called a luminance accumulation value lum_acc_cur) to the delay section 72, the difference calculation section 73, and the threshold-value creation section 76.

The delay section 72 delays the luminance accumulation value lum_acc_cur from the luminance accumulation section 71 by one frame of the contracted image, and supplies the value to the difference calculation section 73 as an immediately-before luminance accumulation value lum_acc_pre.

The difference calculation section 73 calculates an absolute difference value between the luminance accumulation value lum_acc_cur from the luminance accumulation section 71 and the immediately-before luminance accumulation value lum_acc_pre from the delay section 72, and sends the resulting luminance difference value acc_diff to the coring section 74 as a luminance difference value acc_dif.

The coring section 74 performs coring processing (processing to change a value between 0 and a predetermined value to all 0) on the luminance difference value acc_dif from the difference calculation section 73, and supplies a normalized luminance difference value val multiplied by a predetermined coefficient to the threshold-value processing section 75.

The threshold-value processing section 75 performs threshold value processing on the normalized luminance difference value val from the coring section 74 on the basis of a plurality of threshold values supplied from the threshold-value creation section 76, and determines a luminance change level lum_change_level corresponding to the normalized luminance difference value val having been subjected to the threshold value processing.

The threshold-value creation section 76 creates a plurality of threshold values to be used for the threshold value processing of the threshold-value processing section 75 in accordance with the luminance accumulation value lum_acc_cur from the luminance accumulation section 71.

Here, a description will be given of an example of a configuration of the threshold-value creation section 76 with reference to FIG. 4.

Figure 4:
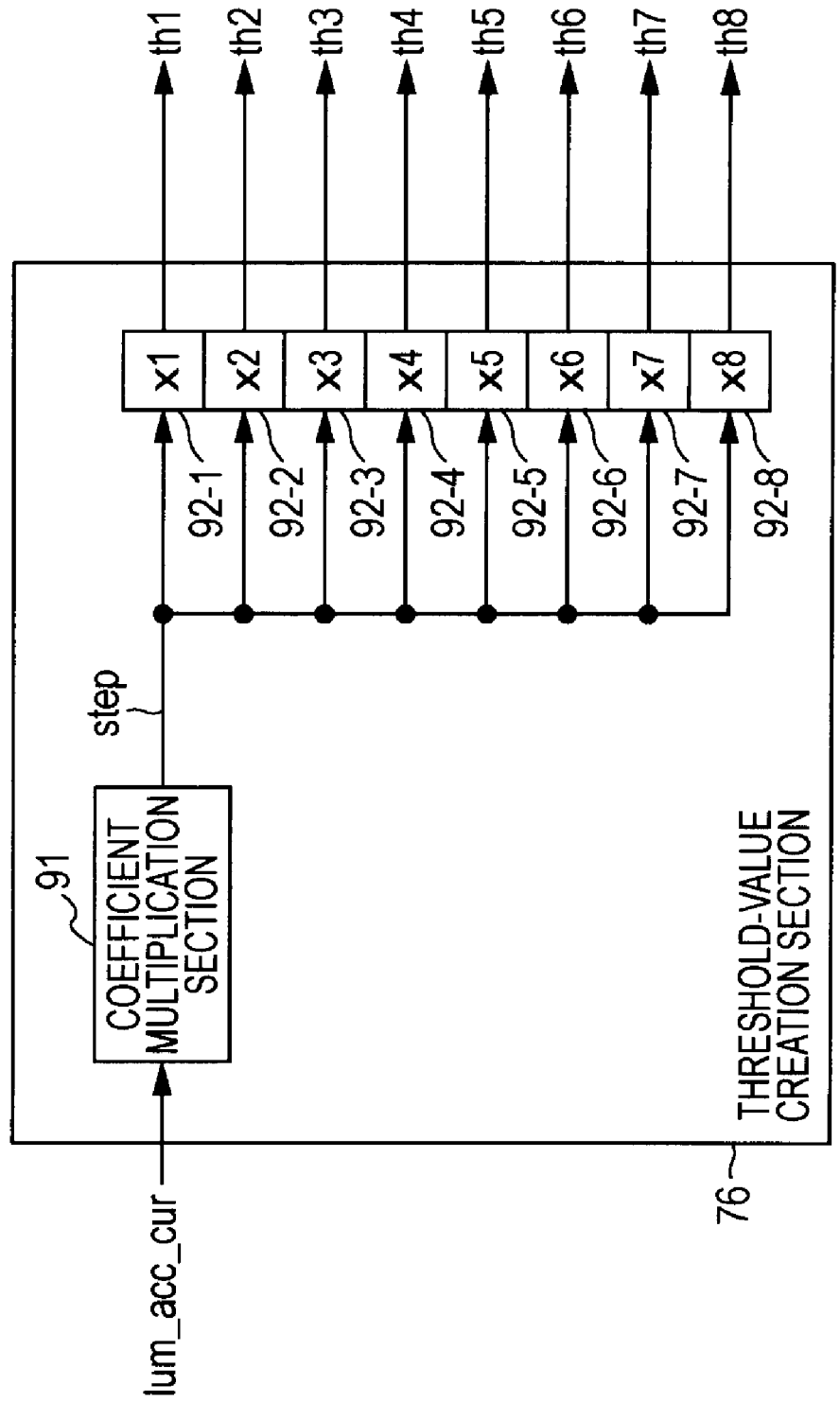
FIG. 4 is a block diagram illustrating an example of a functional configuration of the threshold-value creation section.

The threshold-value creation section 76 in FIG. 4 includes a coefficient multiplication section 91, and multipliers 92-1 to 92-8. In this regard, in the following, the multipliers 92-1 to 92-8 are referred to as a multiplier 92-N (N is an integer 1 to 8) if they are not necessary to be distinguished individually.

The coefficient multiplication section 91 multiplies the luminance accumulation value lum_acc_cur from the luminance accumulation section 71 by a predetermined coefficient (for example, a coefficient sufficiently lower value than 1), and supplies the result value step to the multiplier 92-N. The coefficient multiplied by the coefficient multiplication section 91 is, for example a fixed value, which is set freely by a user's operation.

The multiplier 92-N supplies a threshold value thN (=step× N) produced by multiplying the value step from the coefficient multiplication section 91 by a numeric value N to the threshold-value processing section 75. For example, a multiplier 92-1 supplies a threshold value th1 (=step×1) produced by multiplying the value step from the coefficient multiplication section 91 by 1 to the threshold-value processing section 75. Also, a multiplier 92-2 supplies a threshold value th2 (=step×2) produced by multiplying the value step from the coefficient multiplication section 91 by 2 to the threshold-value processing section 75. In the same manner, multipliers 92-3 to 92-8 supplies threshold values th3 to th8 to the threshold-value processing section 75.

With this arrangement, it is possible for the threshold-value creation section 76 to dynamically set a threshold value for grading the luminance change between frames having a difference in time in accordance with the accumulated values of the luminance values of individual pixels constituting the contracted image (input image). Accordingly, it is not necessary for the user to set a plurality of threshold values individually.

Figure 3:
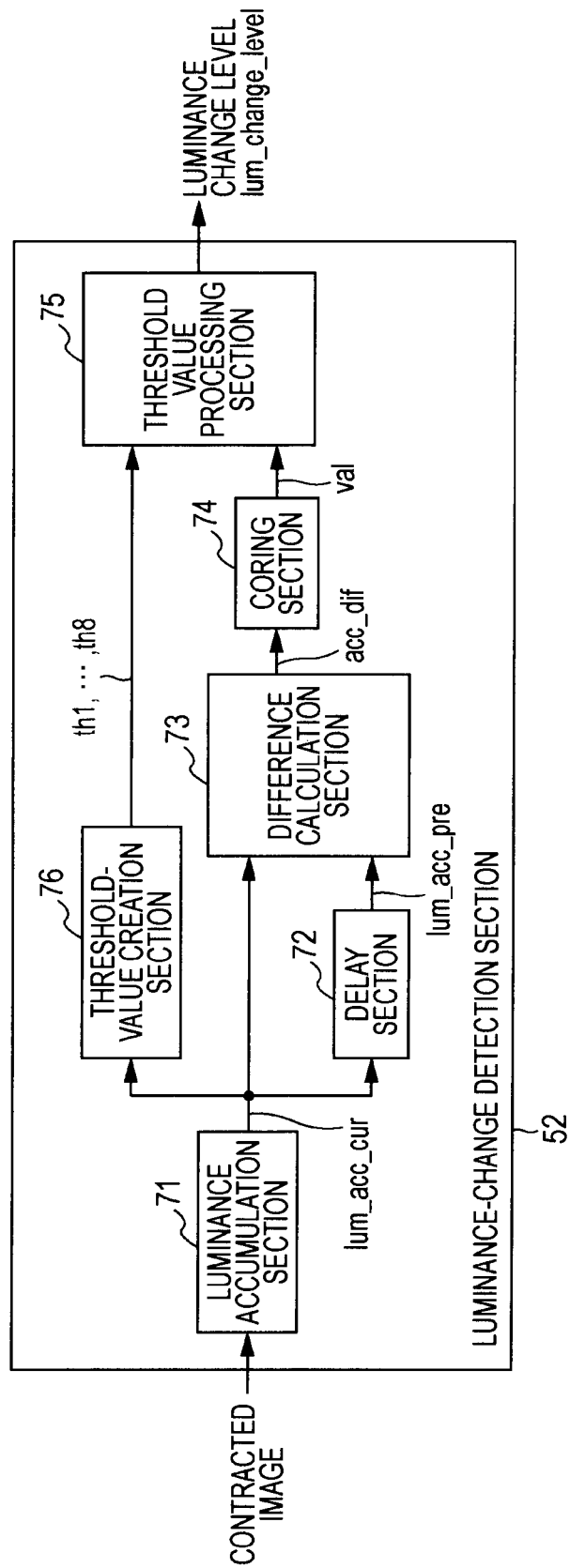
FIG. 3 is a block diagram illustrating an example of a functional configuration of the luminance-change detection section.

Also, the threshold-value processing section 75 in FIG. 3 grades (sets a luminance change level) a luminance change between consecutive (different in time) frames in accordance with eight threshold values th1 to th8 supplied from the multipliers 92-1 to 92-8. The threshold-value processing section 75 determines the luminance change level lum_change_level corresponding to the normalized luminance difference value val on the basis of the threshold values th1 to th8.

Here, a description will be given of a relationship of the threshold values th1 to th8 and the luminance change level lum_change_level with reference to FIG. 5.

Figure 5:
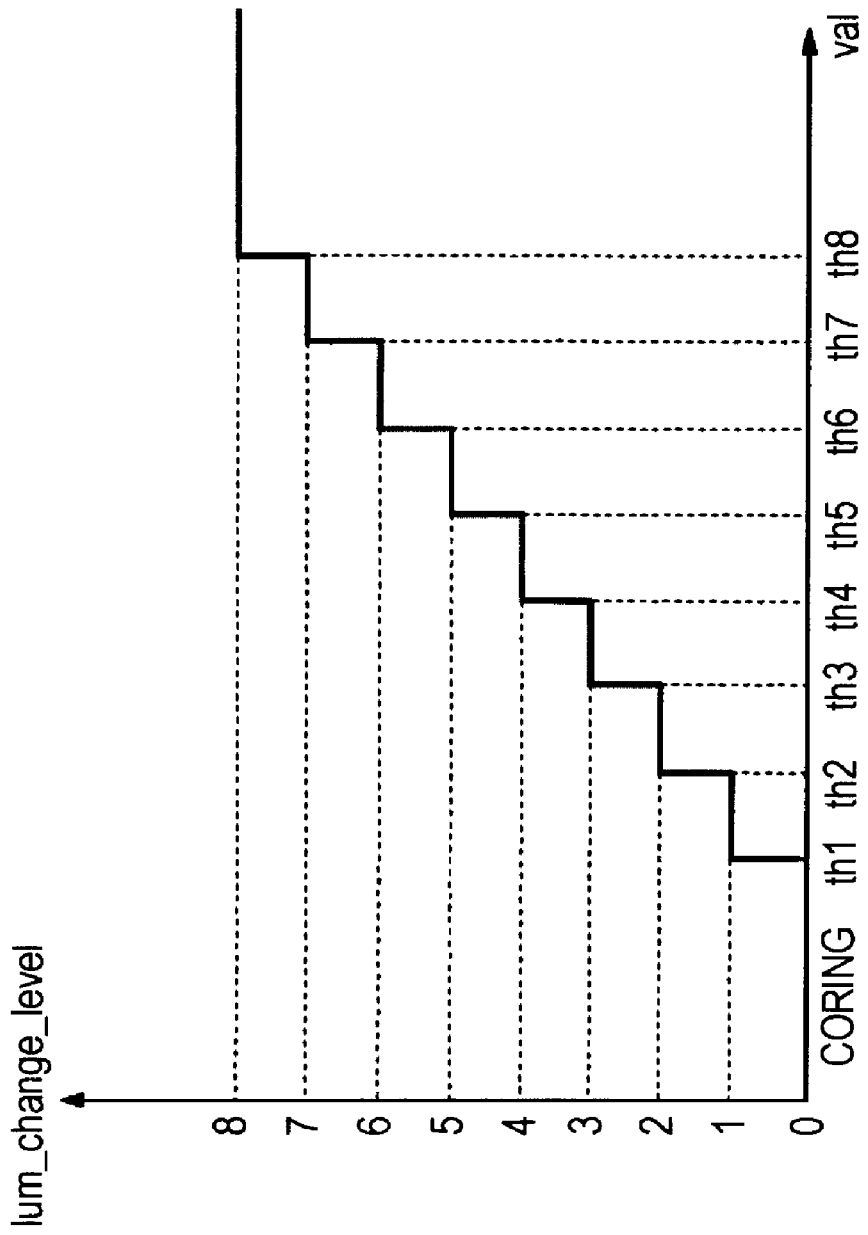
FIG. 5 is a diagram illustrating the relationship between a threshold value and a luminance change level.

In FIG. 5, the horizontal axis represents a normalized luminance difference value val, and the vertical axis represents a luminance change level lum_change_level. The threshold values th1 to th8 are shown at intervals of the value step on the horizontal axis, and nine grades, values 0 to 8, of the luminance change level lum_change_level are shown on the vertical axis.

By the relationship shown in FIG. 5, if the value of the normalized luminance difference value val from the coring section 74 is not less than the threshold value th1 and less than the threshold value th2, the threshold-value processing section 75 outputs 1 as the luminance change level lum_change_level. If the value of the normalized luminance difference value val is not less than the threshold value th2 and less than the threshold value th3, the threshold-value processing section 75 outputs 2 as the luminance change level lum_change_level. If the value of normalized luminance difference value val is not less than the threshold value th3 and less than the threshold value th4, the threshold-value processing section 75 outputs 3 as the luminance change level lum_change_level. If the value of the normalized luminance difference value val is not less than the threshold value th4 and less than the threshold value th5, the threshold-value processing section 75 outputs 4 as the luminance change level lum_change_level. If the value of the normalized luminance difference value val is not less than the threshold value th5 and less than the threshold value th6, the threshold-value processing section 75 outputs 5 as the luminance change level lum_change_level. If the value of the normalized luminance difference value val is not less than the threshold value th6 and less than the threshold value th7, the threshold-value processing section 75 outputs 6 as the luminance change level lum_change_level. If the value of the normalized luminance difference value val is not less than the threshold value th7 and less than the threshold value th8, the threshold-value processing section 75 outputs 7 as the luminance change level lum_change_level. If the value of the normalized luminance difference value val is not less than the threshold value th8, the threshold-value processing section 75 outputs 8 as the luminance change level lum_change_level.

Also, if the value of the normalized luminance difference value val is less than the threshold value th1, the threshold-value processing section 75 outputs 0 as the luminance change level lum_change_level. At this time, the coring section 74 may determine all the values 0 to th1 to be 0 for the luminance difference value acc_dif from the difference calculation section 73.

Next, a description will be given of an example of a functional configuration of the motion-compensation processing section 34 with reference to a block diagram in FIG. 6.

Figure 6:
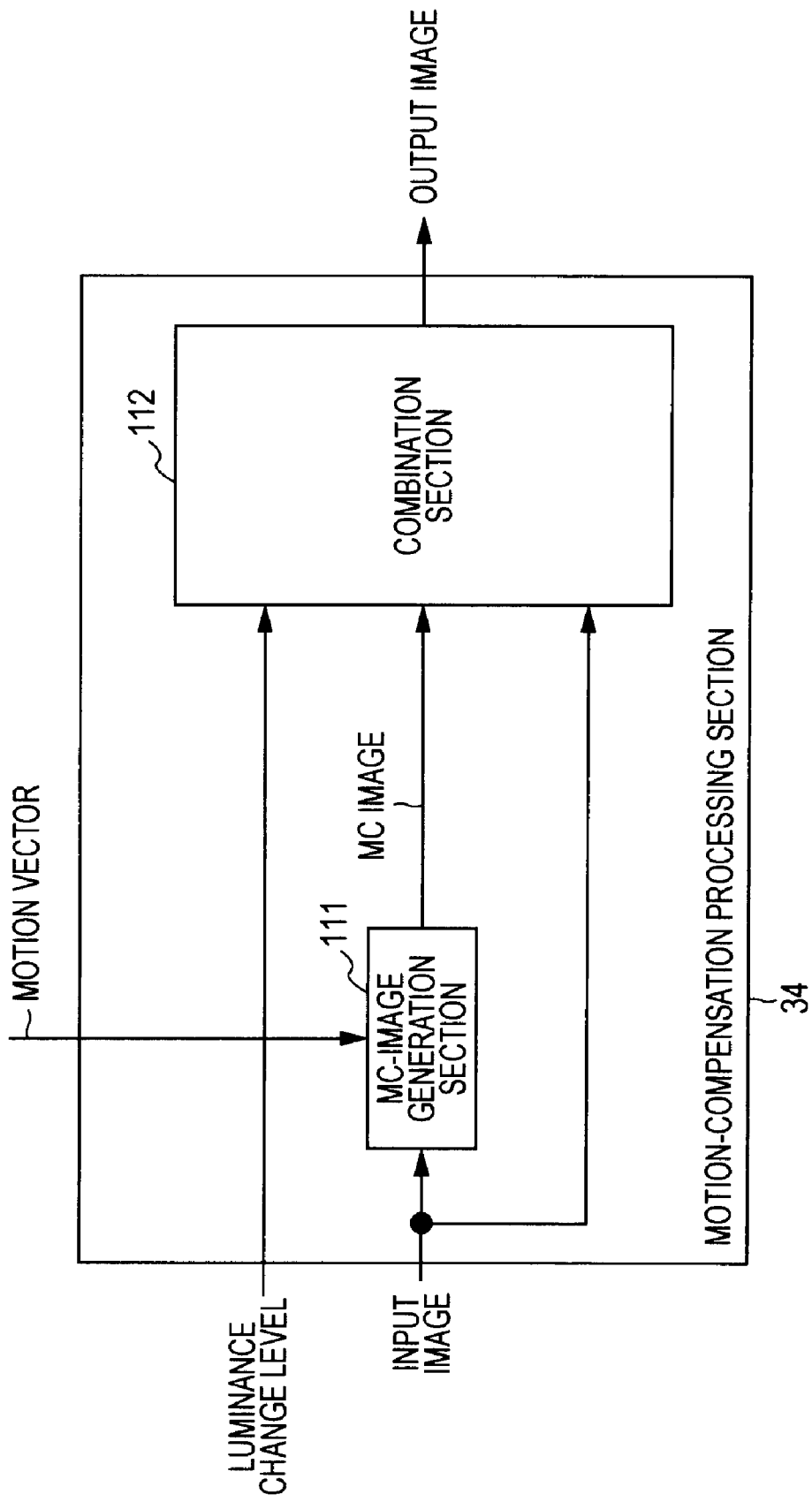
FIG. 6 is a block diagram illustrating an example of a functional configuration of a motion-compensation processing section.

The motion-compensation processing section 34 in FIG. 6 includes an MC-image generation section 111 and a combination section 112.

The MC-image generation section 111 searches pixels of the input image corresponding to individual pixels of the contracted image, which are necessary for generating individual pixels in an MC image by analyzing motion vectors in the individual pixels of the contracted image, supplied from the motion-vector detection section 33. Also, the MC-image generation section 111 generates individual pixels of the MC image using the searched pixels of the input image, up-sampling the number of pixels, for example to four times, and supplies the pixels to the combination section 112. In this regard, in the present embodiment, the MC-image generation section 111 searches only the pixels of the input image, and generates individual pixels of the MC image using only the pixels of the input image. However, for example, the MC-image generation section 111 may also search the pixels of the image one frame immediately before, and may use both the pixels of the input image and the pixels of the immediate-before image.

The combination section 112 combines the input image and the MC image on the basis of the luminance change level lum_change_level from the luminance-change detection section 52, and outputs an image. More specifically, the combination section 112 creates an interpolated image by adding the pixel values of the corresponding pixel positions in the input image and the MC image, respectively, in a weighted ratio in accordance with the luminance change level lum_change_level. The combination section 112 outputs the created interpolated image to a display section, etc., not shown in the figure, as an output image.

Figure 7:
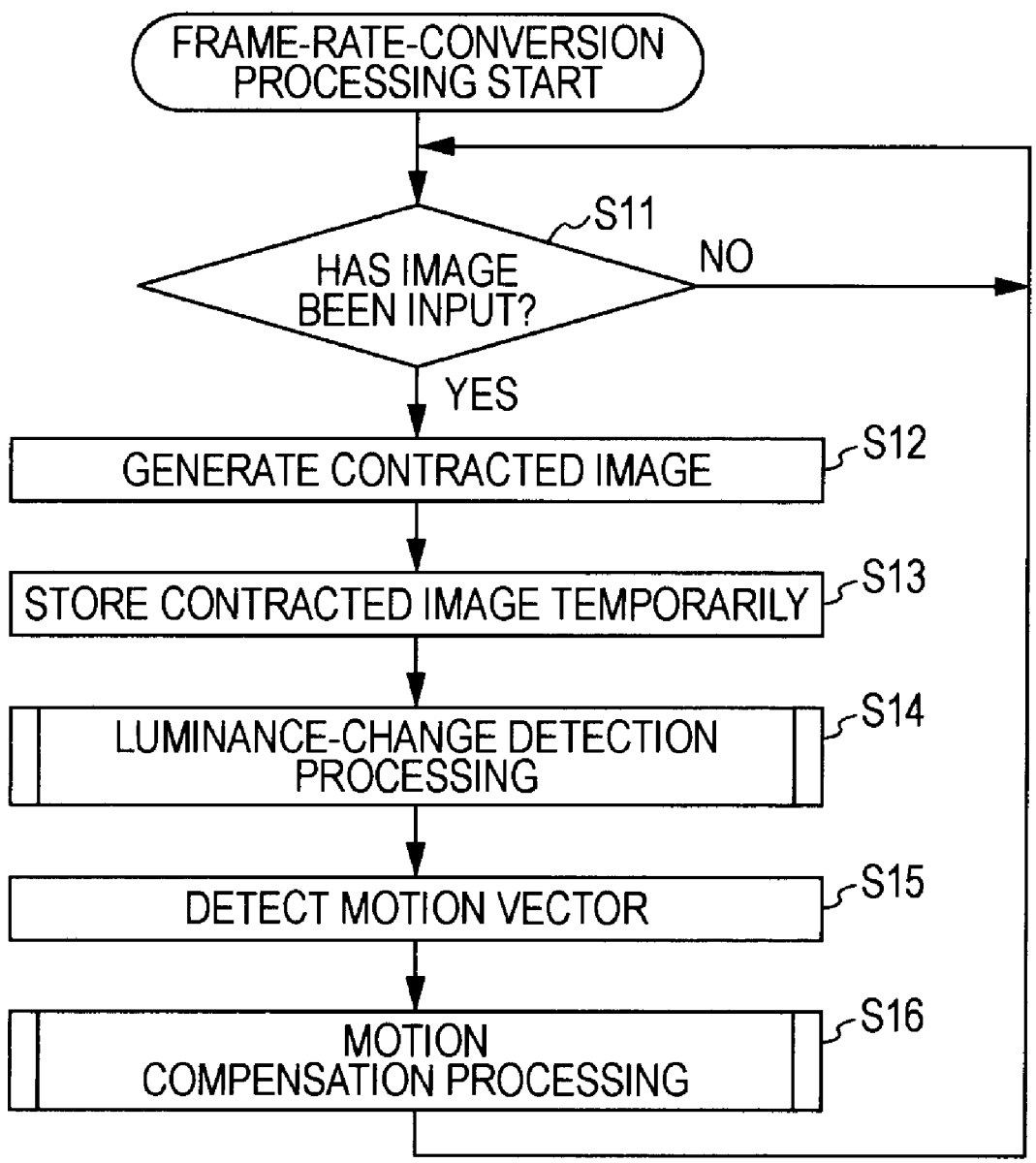
FIG. 7 is a flowchart illustrating frame-rate conversion processing.

Next, a description will be given of the frame-rate conversion processing with reference to a flowchart in FIG. 7.

In step S11, the pre-processing section 31 determines whether an input image has been supplied or not. If it is determined that an input image has not been supplied, the processing is repeated until it is determined that an input image has been supplied.

In step S11, if it is determined that an input image has been supplied, in step S12, the image contraction section 51 thins pixels of the input image, thereby generates a contracted image ¼ times the input image, and supplies the image to the frame memory 32, the motion-vector detection section 33, and the luminance-change detection section 52.

In step S13, the frame memory 32 temporarily stores the contracted image supplied from the image contraction section 51, and supplies the contracted image stored at a timing immediately before to the motion-vector detection section 33 as the immediately-before contracted image. By this processing, the contracted image and the immediately-before contracted image are individually supplied to the motion-vector detection section 33.

In step S14, the luminance-change detection section 52 performs luminance-change detection processing detecting a luminance change between the contracted image supplied from the image contraction section 51 and the contracted image having a delay of one frame from that contracted image. The luminance-change detection section 52 supplies a luminance change level indicating a degree of the detected luminance change to the motion-compensation processing section 34. In this regard, a detailed description will be given of the luminance-change detection processing in step S14 later with reference to FIG. 8.

In step S15, the motion-vector detection section 33 obtains motion vectors of individual pixels of the contracted image on the basis of the contracted image from the image contraction section 51 and the immediately-before contracted image from the frame memory 32, and supplies the motion vectors to the motion-compensation processing section 34.

In step S16, the motion-compensation processing section 34 performs motion compensation processing on the basis of the input image and the motion vectors, and at the same time, generates an MC image, combines the MC image and the input image on the basis of the luminance change level from the luminance-change detection section 52, and outputs the image as an output image. In this regard, a detailed description will be given of the motion compensation processing in step S16 with reference to FIG. 10.

Figure 8:
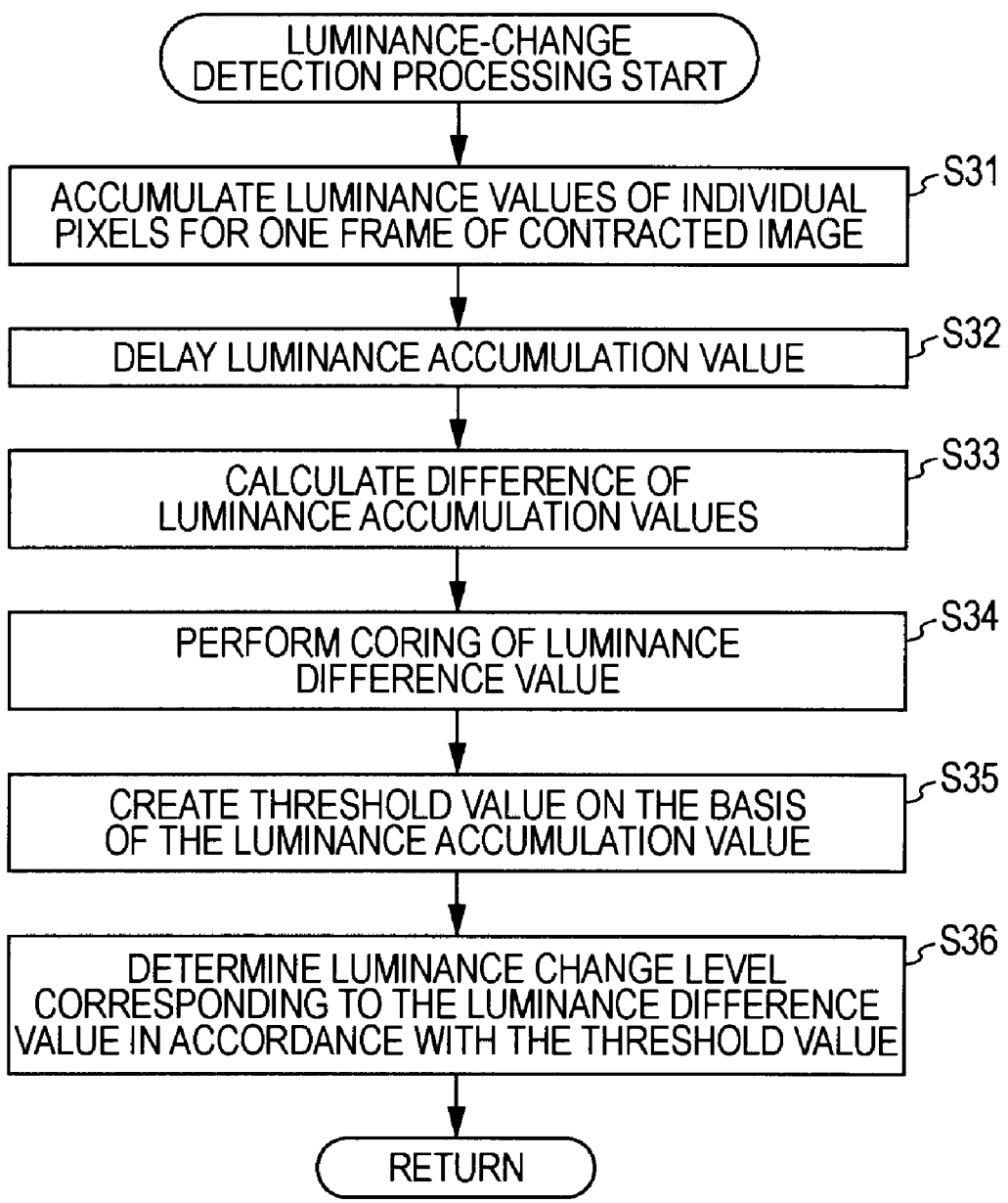
FIG. 8 is a flowchart illustrating luminance-change detection processing.

Next, a description will be given of the luminance-change detection processing of step S14 in FIG. 7 with reference to a flowchart in FIG. 8.

In step S31, the luminance accumulation section 71 accumulates the luminance values of individual pixels for one frame of the contracted image from the image contraction section 51, and supplies the accumulated result, the luminance accumulation value lum_acc_cur to the delay section 72, the difference calculation section 73, and the threshold-value creation section 76.

In step S32, the delay section 72 delays the luminance accumulation value lum_acc_cur from the luminance accumulation section 71 by one frame of the contracted image, and supplies the value to the difference calculation section 73 as an immediately-before luminance accumulation value lum_acc_pre. By this processing, the luminance accumulation value lum_acc_cur and the immediately-before luminance accumulation value lum_acc_pre are individually supplied to the difference calculation section 73.

In step S33, the difference calculation section 73 calculates an absolute difference value between the luminance accumulation value lum_acc_cur and the immediately-before luminance accumulation value lum_acc_pre, and supplies the resulting luminance difference value acc_diff to the coring section 74 as the luminance difference value acc_dif.

In step S34, the coring section 74 performs coring processing on the luminance difference value acc_dif from the difference calculation section 73, and supplies a normalized luminance difference value val multiplied by a predetermined coefficient to the threshold-value processing section 75.

In step S35, the threshold-value creation section 76 creates, for example, eight threshold values th1 to th8 in accordance with the luminance accumulation value lum_acc_cur from the luminance accumulation section 71, and supplies the threshold values to the threshold-value processing section 75.

In step S36, the threshold-value processing section 75 performs threshold value processing on the normalized luminance difference value val from the coring section 74 on the basis of the threshold values th1 to th8, which are supplied from the threshold-value creation section 76, and determines the luminance change level lum_change_level corresponding to normalized luminance difference value val having been subjected to the threshold value processing.

Here, with reference to FIG. 9, a description will be given of a relationship between the luminance accumulation value, the luminance difference value, and the luminance change level.

Figure 9:
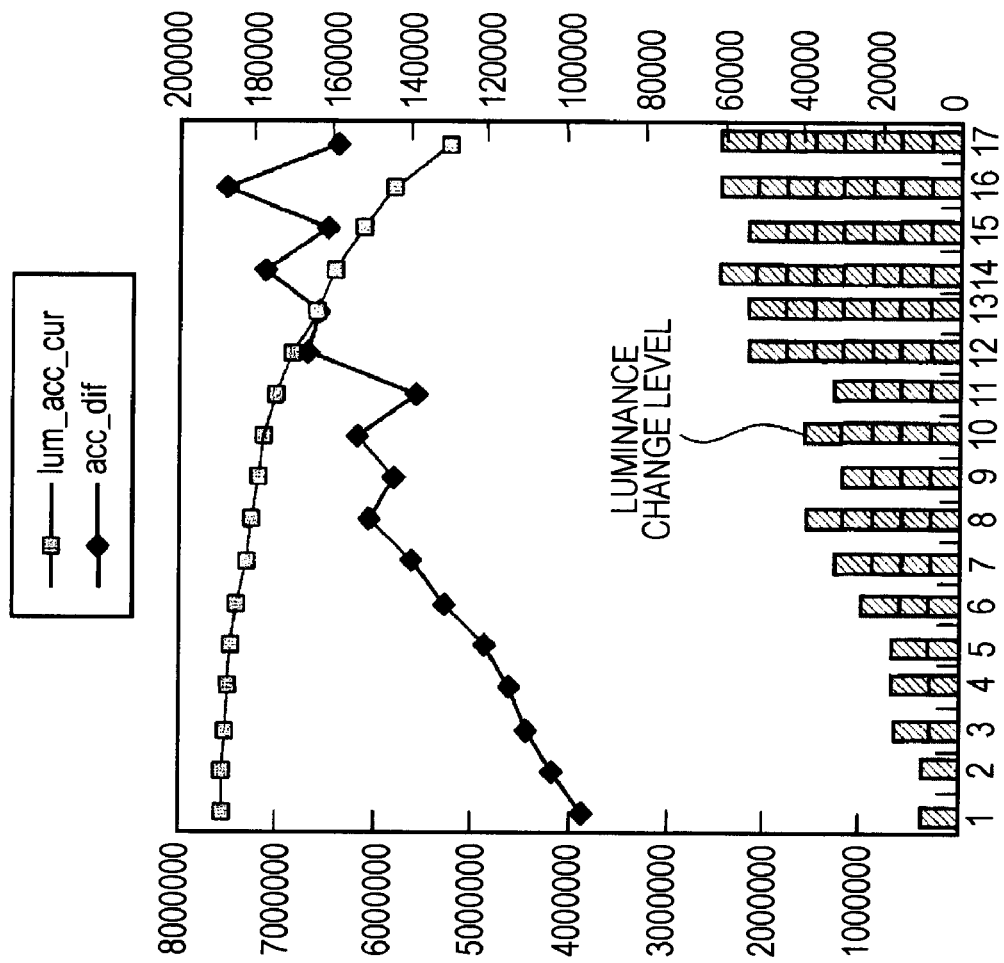
FIG. 9 is a diagram illustrating a relationship between the luminance accumulation value, the luminance difference value, and the luminance change level.

In FIG. 9, the horizontal axis represents time, the vertical axis on the right side represents the luminance accumulation value lum_acc_cur, and the vertical axis on the left side represents the luminance difference value acc_dif. Also, in FIG. 9, an indicator displayed for each time shows a luminance change level (0 to 8).

As shown by a plot with a square in FIG. 9, the luminance accumulation value lum_acc_cur decreases with time. This shows that an input image is fading out. In this regard, in FIG. 9, the luminance accumulation value lum_acc_cur decreases acceleratedly with time. That is to say, as shown by a plot with a diamond in FIG. 9, the luminance difference value acc_dif increases with time. In the same manner as the luminance difference value acc_dif, the luminance change level shown by the indicator increases with time. That is to say, the luminance change level increases as the input image fades out.

Also, in FIG. 9, a comparison of the luminance difference value acc_dif at time 16 and the luminance difference value acc_dif at time 17 indicates that the luminance difference value acc_dif at time 17 is lower than the luminance difference value acc_dif at time 16 by about 30000. If the threshold value in the threshold value processing of the threshold-value processing section 75 is constant, the luminance change level at time 17 ought to be a same luminance change level 7 at time 15 when the luminance difference value acc_dif has a substantially same value. However, the luminance change levels at time 16 and at time 17 are both 8, and there is no difference. This is because if the luminance accumulation value lum_acc_cur decreases, the threshold values th1 to th8 created by the threshold-value creation section 76 also become low. That is to say, when the threshold values th1 to th8 becomes low, even if the luminance difference value acc_dif is low, the luminance difference value acc_dif tends to be over a threshold value in the threshold value processing, and the luminance change level tends to be determined at a high level.

As described above, the luminance change level of the input image (contracted image) is determined on the basis of the threshold value obtained in accordance with the luminance value of the input image (contracted image).

As a result, it becomes possible to detect a luminance change of an input image, that is to say, a fade-in and a fade-out more easily without setting a threshold value by a user's operation.

Also, in the above-described processing, fade detection (luminance change detection) is performed using a contracted image, and thus the amount of calculation is less than that of the case of directly using the input image.

Figure 10:
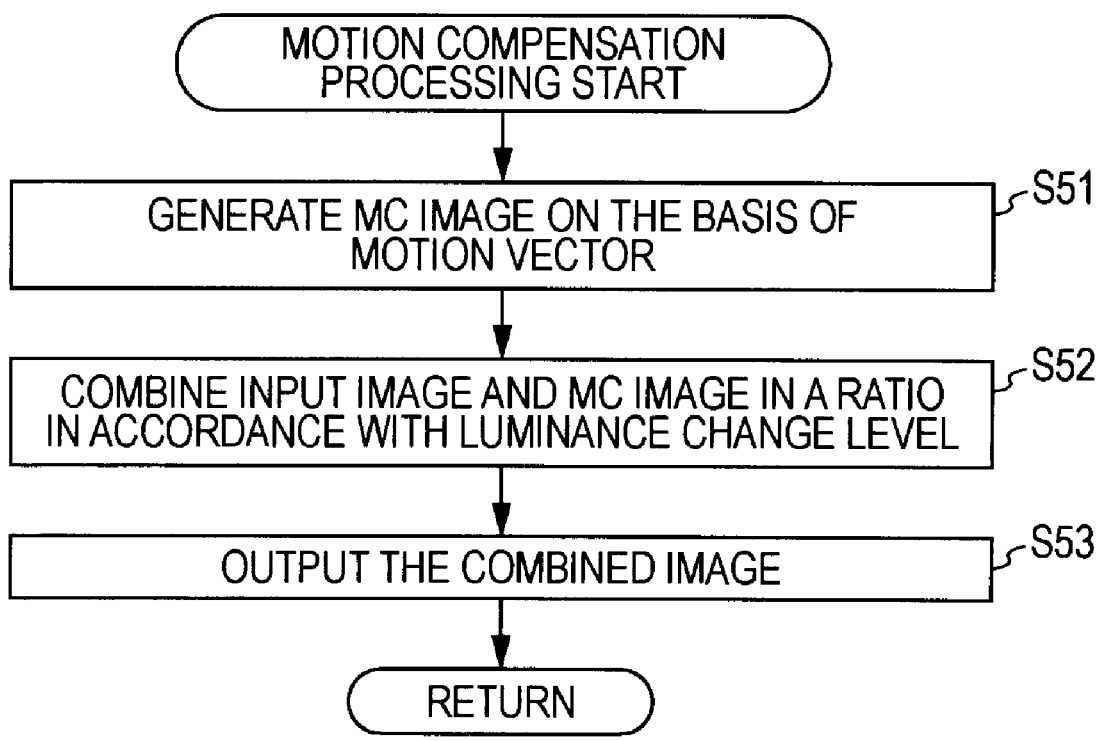
FIG. 10 is a flowchart illustrating motion compensation processing.

Next, a description will be given of the motion compensation processing of step S16 in FIG. 7 with reference to a flowchart in FIG. 10.

In step S51, the MC-image generation section 111 generates an MC image on the basis of the motion vectors supplied from the motion-vector detection section 33. More specifically, the MC-image generation section 111 searches pixels on the input image corresponding to individual pixels of the contracted image, which are necessary for generating individual pixels in the MC image by analyzing motion vectors in the individual pixels of the contracted image. Also, the MC-image generation section 111 generates individual pixels of the MC image using the searched pixels of the input image, up-sampling the number of pixels to four times, and supplies the pixels to the combination section 112.

In step S52, the combination section 112 combines the input image and the MC image in a ratio in accordance with the luminance change level lum_change_level. More specifically, the combination section 112 creates an interpolated image by adding the pixel values of the corresponding pixel positions in the input image and the MC image, respectively, in a weighted ratio in accordance with the luminance change level lum_change_level.

For example, if the luminance change level lum_change_level is 8, the combination section 112 creates an interpolated image by adding the pixel values of the corresponding pixels in the input image and the MC image, respectively, in a weighted ratio of 8:0. That is to say, if the luminance change level lum_change_level is 8, the combination section 112 directly outputs the input image as an interpolated image.

Also, for example, if the luminance change level lum_change_level is 5, the combination section 112 creates an interpolated image by adding the pixel values of the corresponding pixels in the input image and the MC image, respectively, in a weighted ratio of 5:3.

Further, for example, if the luminance change level lum_change_level is 0, the combination section 112 creates an interpolated image by adding the pixel values of the corresponding pixels in the input image and the MC image, respectively, in a weighted ratio of 0:8. That is to say, if the luminance change level lum_change_level is 0, the combination section 112 directly outputs the MC image as an interpolated image.

In this manner, the higher the luminance change level lum_change_level is, the higher ratio of the input image in an interpolated image is output by the combination section 112. And the lower the luminance change level lum_change_level is, the higher ratio of the MC image in an interpolated image is output by the combination section 112.

In step S53, the combination section 112 outputs the combined interpolated image to a display section, etc., not shown in the figure, as an output image.

By the above-described processing, for an image which has high reliability in motion vectors and is not fading in or fading out, an image which having a high ratio of the MC image generated by the motion compensation processing is output. On the contrary, for an image which has low reliability in motion vectors because of being fading in or fading out, an image including a high ratio of the input image is output.

As a result, in the frame rate conversion processing on an input image including a fade-in or a fade-out, by which motion vectors are apt to be mistakenly detected, even if fading is detected, it is possible to output an interpolated image having a little influence of errors in the motion compensation using the mistakenly detected motion vectors.

As described above, in the image processing apparatus 11, the luminance difference value acc_dif is calculated between the luminance accumulation value lum_acc_cur produced by accumulating luminance values of a plurality of pixels in the contracted image and the immediately-before luminance accumulation value lum_acc_pre produced by accumulating luminance values of a plurality of pixels in the immediately-before contracted image having a difference in time with the contracted image. In order to grade a luminance change between the contracted image and the immediately-before contracted image by the luminance change level lum_change_level, a plurality of threshold values th1 to th8 on the difference value are created corresponding to the luminance change levels in accordance with the luminance accumulation value lum_acc_cur. A determination is then made on the luminance-change level lum_change_level corresponding to the difference value on the basis of the plurality of threshold values th1 to th8. Accordingly, it is possible to detect a fade-in and a fade-out more easily without setting a threshold value by a user's operation.

Further, in the image processing apparatus 11, motion vectors may be detected by block matching between the input image and the contracted image, the input image may next be compensated by the motion vectors to create a motion-compensated image, and a combination is then made between individual pixels of the input image and individual pixels of the corresponding motion-compensated image in order to output an interpolated image interpolating the input image. Accordingly, in the frame rate conversion processing on an input image including a fade-in or a fade-out, by which motion vectors are apt to be mistakenly detected, even if fading is detected, it is possible to output an interpolated image having a little influence of errors in the motion compensation using the mistakenly detected motion vectors.

In this regard, in the above processing, the luminance change level lum_change_level is graded by nine grades from 0 to 8. However, the luminance change level may be graded by a smaller number of grades or may be graded by a larger number of grades.

Also, in the above processing, a description has been given of the processing using a contracted image corresponding to an input image and the immediately-before contracted image. However, another image may be used as far as the image is of different timing. For example, a contracted image and the immediately-after contracted image may be used, or the contracted image of two-frame before and the contracted image corresponding to an input image, etc., may be used. Also, a description has been given of an example of using two images, a contracted image and the immediately-before contracted image. However, more than two images may be used. For example, the processing may be performed using a contracted image and the immediately-before contracted image, and the immediately-after contracted image may be used. Alternatively, the processing using a larger number of images than that may be performed.

The above-described series of processing can be executed by hardware or by software. When the series of processing is executed by software, programs constituting the software may be installed in a computer built in a dedicated hardware. Alternatively, the programs may be installed from a program recording medium, for example in a general-purpose personal computer, etc., capable of executing various functions by installing various programs.

Figure 11:
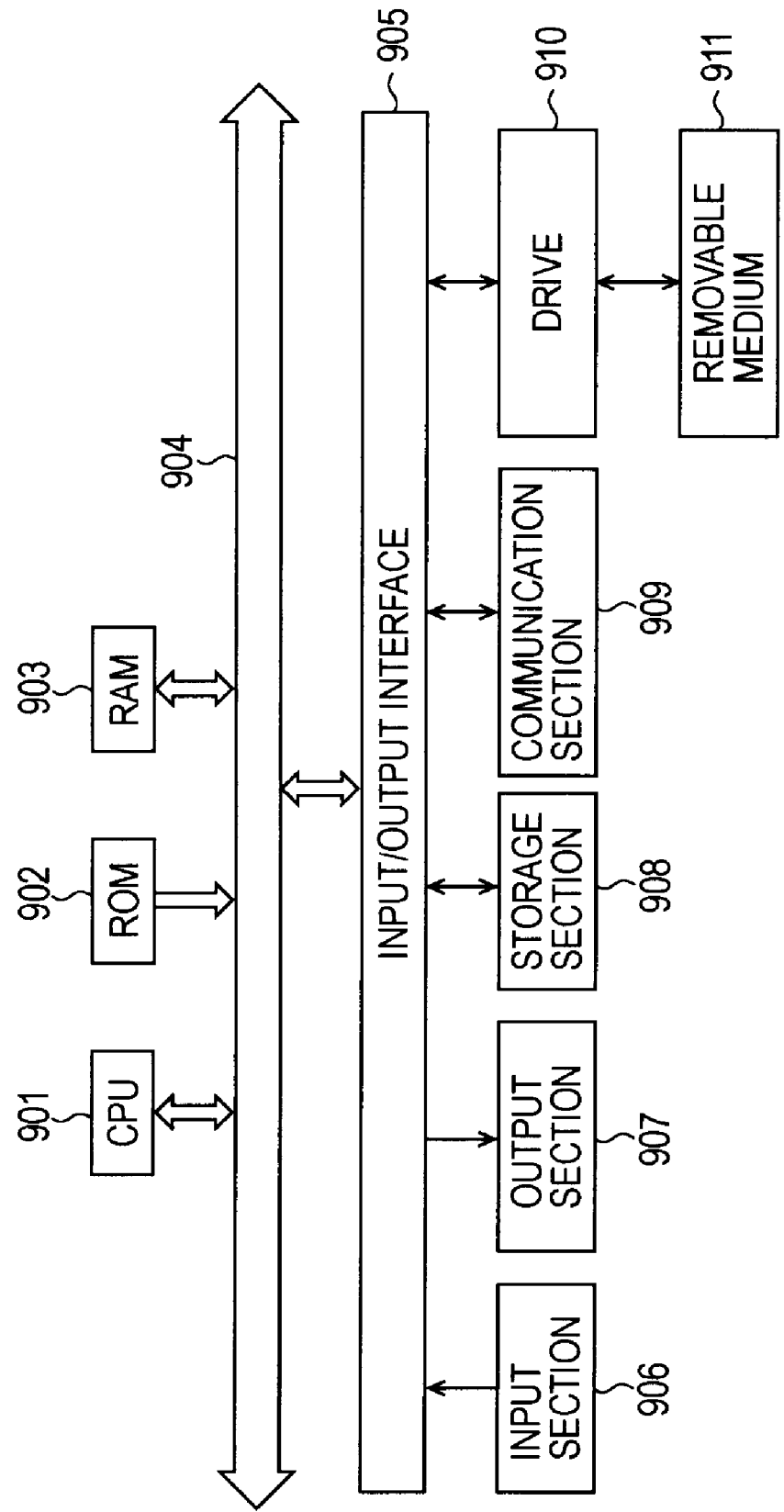
FIG. 11 is a diagram illustrating an example of a configuration of a personal computer.

FIG. 11 is a block diagram illustrating an example of a hardware configuration of a computer which executes the above-described series of processing by programs.

In the computer, a CPU (Central Processing Unit) 901, a ROM (Read Only Memory) 902, a RAM (Random Access Memory) 903 are mutually connected through a bus 904.

An input/output interface 905 is also connected to the bus 904. An input section 906 including a keyboard, a mouse, a microphone, etc., an output section 907 including a display, a speaker, etc., a storage section 908 including a hard disk, a nonvolatile memory, etc., a communication section 909 including a network interface, etc., and a drive 910 for driving a removable medium 911, such as a magnetic disk, an optical disc, a magneto-optical disc, or a semiconductor memory, etc., are connected to the input/output interface 905.

In the computer having the configuration as described above, the CPU 901 loads the program stored, for example in storage section 908 to the RAM 903 through the input/output interface 905 and the bus 904 to execute the program, thereby the above-described series of processing is performed.

The program to be executed by the computer (CPU 901) is recorded in a removable medium 911, which is a package medium including, such as a magnetic disk (including a flexible disk), an optical disc (including a CD-ROM (Compact Disc-Read Only Memory), a DVD (Digital Versatile Disc), etc.), a magneto-optical disc, or a semiconductor memory, etc. Alternatively, the program may be provided through wired or wireless transmission, such as a local area network, the Internet, a digital satellite broadcasting, etc.

The program can be installed in the storage section 908 through the input/output interface 905 by attaching the removable medium 911 to the drive 910. Also, the program can be received by the communication section 909 through a wired or wireless transmission medium and can be installed in the storage section 908. In addition, the program may be installed in the ROM 902 or the storage section 908 in advance.

In this regard, the programs executed by the computer may be programs that are processed in time series in accordance with the described sequence in this specification. Alternatively, the programs may be the programs to be executed in parallel or at necessary timing, such as at the time of being called, or the like.

The present application contains subject matter related to that disclosed in Japanese Priority Patent Application JP 2008-166062 filed in the Japan Patent Office on Jun. 25, 2008, the entire content of which is hereby incorporated by reference.

In this regard, an embodiment of the present invention is not limited to the above-described embodiments. It is possible to make various changes without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a difference-value calculation means for calculating a difference value between the first accumulated value produced by accumulating luminance values of a plurality of pixels in a first image and the second accumulated value produced by accumulating luminance values of a plurality of pixels in a second image having a difference in time with the first image;
   a threshold-value creation means for creating a plurality of threshold values on the difference value, in accordance with the first accumulated value, corresponding to the luminance change levels in order to grade a luminance change between the first image and the second image by a luminance change level, indicating a degree of the luminance change; and
   a luminance-change-level determination means for determining the luminance change level corresponding to the difference value on the basis of the plurality of threshold values.

2. The image processing apparatus according to claim 1, further comprising:
   a motion-vector detection means for detecting a motion vector by block matching the first image and the second image;
   a motion-compensation image generation means for generating a motion compensation image by compensating motion on the first image by the motion vector; and
   an interpolated-image output means for combining each pixel in the first image and a corresponding pixel in the motion compensation image in a ratio in accordance with the luminance change level determined by the luminance-change-level determination means.

3. The image processing apparatus according to claim 2, wherein, the higher the luminance change level determined by the luminance-change-level determination means is, the higher ratio of the first image in the interpolated image is output by the interpolated-image output means, and the lower the luminance change level is, the higher ratio of the motion compensation image in the interpolated image is output by the interpolated-image output means.

4. The image processing apparatus according to claim 2, further comprising a contracted-image generation means for generating a first contracted image produced by contracting the first image,
wherein the difference-value calculation means calculates a difference value between the first luminance value, produced by accumulating luminance values of a plurality of pixels in the first contracted image, and the second luminance value, produced by accumulating luminance values of a plurality of pixels in the second contracted image.

5. The image processing apparatus according to claim 4, the motion-vector detection means detects the motion vector from the first contracted image and the second contracted image.

6. A method of processing an image, comprising the steps of:
calculating a difference value between the first accumulated value produced by accumulating luminance values of a plurality of pixels in a first image and the second accumulated value produced by accumulating luminance values of a plurality of pixels in a second image having a difference in time with the first image;
creating a plurality of threshold values on the difference value, in accordance with the first accumulated value, corresponding to the luminance change levels in order to grade a luminance change between the first image and the second image by a luminance change level indicating a degree of the luminance change; and
determining the luminance-change-level corresponding to the difference value on the basis of the plurality of threshold values.

7. A non-transitory computer readable medium comprising a program, the program being operable, when executed by a computer system, to cause the computer system to perform a method, the method comprising the steps of:
calculating a difference value between the first accumulated value produced by accumulating luminance values of a plurality of pixels in a first image and the second accumulated value produced by accumulating luminance values of a plurality of pixels in a second image having a difference in time with the first image;
creating a plurality of threshold values on the difference value, in accordance with the first accumulated value, corresponding to the luminance change levels in order to grade a luminance change between the first image and the second image by a luminance change level indicating a degree of the luminance change; and
determining the luminance-change-level corresponding to the difference value on the basis of the plurality of threshold values.

8. An image processing apparatus comprising:
a processor,
a difference-value calculation mechanism configured to calculate, using the processor, a difference value between the first accumulated value produced by accumulating luminance values of a plurality of pixels in the first image and a second accumulated value produced by accumulating luminance values of a plurality of pixels in a second image having a difference in time with the first image;
a threshold-value creation mechanism configured to create, using the processor, a plurality of threshold values on the difference value, in accordance with the first accumulated value, corresponding to the luminance change levels in order to grade a luminance change between the first image and the second image by a luminance change level indicating a degree of the luminance change; and
a luminance-change-level determination mechanism configured to determine, using the processor, the luminance change level corresponding to the difference value on the basis of the plurality of threshold values.

* * * * *